(12) United States Patent
Purcell (10) Patent No.: US 7,676,536 B1
(45) Date of Patent: *Mar. 9, 2010

(54) EFFICIENTLY DETERMINING A FLOOR FOR A FLOATING-POINT NUMBER

(76) Inventor: Stephen Clark Purcell, 365 Preston Dr., Mountain View, CA (US) 94040

(*) Notice: Subject to any disclaimer, the term of this patent is extended or adjusted under 35 U.S.C. 154(b) by 1079 days.

This patent is subject to a terminal disclaimer.

(21) Appl. No.: 11/302,948

(22) Filed: Dec. 13, 2005

Related U.S. Application Data (63) Continuation of application No. 09/925,136, filed on Aug. 8, 2001, now Pat. No. 7,003,539.

(51) Int. Cl.
  *G06F 7/38* (2006.01)
(52) U.S. Cl. ...................................... 708/497
(58) Field of Classification Search ......... 708/496–497, 708/204
  See application file for complete search history.

(56) References Cited

U.S. PATENT DOCUMENTS

| | | | |
|---|---|---|---|
| 5,258,943 A | 11/1993 | Gamez et al. | |
| 5,568,412 A | 10/1996 | Han et al. | |
| 6,535,898 B1 | 3/2003 | Yuval | |
| 6,557,021 B1 | 4/2003 | Brooks et al. | |
| 2002/0087609 A1 | 7/2002 | Zohar | |

*Primary Examiner*—Tan V Mai
(74) *Attorney, Agent, or Firm*—McDonnell Boehnen Hulbert & Berghoff LLP (57) ABSTRACT

An apparatus, method and computer program product for processing a binary floating-point number having a sign bit and a mantissa having a fraction portion. It includes identifying the fraction portion of the binary floating-point number; and replacing each bit of the fraction portion with the sign bit, thereby producing a floor of the binary floating-point number.

8 Claims, 7 Drawing Sheets

EFFICIENTLY DETERMINING A FLOOR FOR A FLOATING-POINT NUMBER

BACKGROUND

This application is a continuation of prior Applicaion No. 09/925,136, filed Aug. 8, 2001 now U.S. Pat. No. 7,003,539.

The present invention relates generally to computation using binary floating-point numbers, and particularly to finding the floor of a floating-point number.

The floor for a floating-point number x is the largest integer less than or equal to x. So while the floor for 2.5 is 2, the floor for −2.5 is −3. Consequently, finding a floor is more difficult for negative floating-point numbers than for positive floating-point numbers.

SUMMARY

In general, in one aspect, the invention features an apparatus, method and computer program product for processing a binary floating-point number having a sign bit and a mantissa having a fraction portion. It includes identifying the fraction portion of the binary floating-point number; and replacing each bit of the fraction portion with the sign bit, thereby producing a floor of the binary floating-point number.

Particular implementations can include one or more of the following features. Implementations include decrementing the binary floating-point number before replacing when the binary floating-point number is negative. Implementations include converting the floor to two's complement format. Converting includes performing an exclusive-OR operation between each bit of the floor and the sign bit, thereby producing a result of the exclusive-OR operation; and concatenating the sign bit and the result of the exclusive-OR operation, thereby producing a signed two's complement mantissa of the floor. Converting further includes performing, upon the signed two's complement mantissa of the floor, a signed-right-shift operation, thereby producing the floor of the binary floating-point number in two's complement format.

Implementations include converting the floor to floating-point format. Converting includes incrementing the floor when the binary floating-point number is negative, and doing nothing otherwise, thereby producing an incremented value; and replacing the most-significant bit (MSB) of the incremented value with the exponent bits and the sign bit, such that the sign bit is the MSB, thereby producing a floor of the binary floating-point number in floating-point format.

The binary floating-point number includes an exponent that differs from an unbiased exponent by a bias offset, and incrementing includes incrementing the floor when the binary floating-point number is negative and the exponent is greater than, or equal to, the bias offset, thereby producing an incremented value. The binary floating-point number includes an exponent that differs from an unbiased exponent by a bias offset, and incrementing further includes replacing the exponent bits with the offset when the binary floating-point number is negative and the exponent is less than the offset; and replacing the exponent bits with zeros when the binary floating-point number is positive and the exponent is less than the offset.

Implementations include taking a floating-point difference between a value of the binary floating-point number before replacing and a value of the binary floating-point number after replacing, thereby producing a fractional remainder of the binary floating-point number.

The binary floating-point number includes an exponent that differs from an unbiased exponent by a bias offset, and replacing includes replacing each bit of the fraction portion with zero ("0") when the exponent is greater than, or equal to, the bias offset. The binary floating-point number includes an exponent that differs from an unbiased exponent by a bias offset, and decrementing includes decrementing the binary floating-point number before replacing when the binary floating-point number is negative unless the exponent is less than the bias offset.

In general, in one aspect, the invention features an apparatus, method and computer program product for determining the floating-point floor of a floating-point number. It includes identifying a binary floating-point number including a sign bit, exponent bits, and mantissa bits, wherein the binary floating-point number is negative when the sign bit is a one ("1"); concatenating an implicit bit and the mantissa bits, thereby producing a first binary number such that the implicit bit is the most significant bit (MSB) of the first binary number; decrementing the first binary number when the sign bit is a one ("1") and doing nothing when the sign bit is a zero ("0"), thereby producing a second binary number; identifying a fraction portion of the second binary number based upon a predetermined exponent bias; replacing each bit of the fraction portion with the sign bit thereby producing a third binary number; performing an exclusive-OR operation between each bit of the third binary number and the sign bit thereby producing a fourth binary number; concatenating the sign bit, the fourth binary number, and a first predetermined number of zeros, thereby producing a fifth binary number such that the sign bit is the MSB of the fifth binary number, and the zeros are the least significant bits of the fifth binary number; and performing, upon the fifth binary number, a signed-right-shift operation by a number of bits equivalent to the difference between the exponent and a second predetermined number, thereby producing the floor of the binary floating-point number in integer format.

Particular implementations can include one or more of the following features. Implementations include subtracting one from the sum of the number of bits in the floating-point floor and the number of bits in the third binary number, thereby producing the first predetermined number. The exponent differs from an unbiased exponent of the floating-point number by a bias offset, and implementations include summing the bias offset, the number of bits in the mantissa, and the first predetermined number, thereby producing the second predetermined number. Replacing includes identifying a fraction mask corresponding to the exponent bits, the fraction mask having a one for each bit belonging to the fraction portion and a zero for each bit belonging to the integer portion; and applying the fraction mask to the second binary number. The implicit bit is zero ("0") when the exponent bits are all zero ("0") and the implicit bit is one ("1") otherwise.

The binary floating-point number includes an exponent that differs from an unbiased exponent of the floating-point number by a bias offset, and replacing includes replacing each bit of the fraction portion with the sign bit when the exponent is greater than, or equal to, the bias offset, thereby producing a third binary number. The binary floating-point number includes an exponent that differs from an unbiased exponent of the floating-point number by a bias offset, and decrementing includes decrementing the first binary number when the sign bit is a one ("1") and doing nothing when the sign bit is a zero ("0"), unless the exponent is less than the bias offset, thereby producing a second binary number.

Implementations include replacing the MSB of the second binary number with the exponent bits and the sign bit, thereby producing a sixth binary number, such that the sign bit is the MSB of the sixth binary number; replacing the MSB of the third binary number with the exponent bits and the sign bit, thereby producing a seventh binary number, such that the sign bit is the MSB of the seventh binary number; and performing a floating point subtraction with the sixth binary number as the minuend and the seventh binary number as the subtrahend, thereby producing a fractional remainder of the floating-point number.

Advantages that can be seen in implementations of the invention include one or more of the following. Implementations of the present invention determine one or both of the floor $\lfloor x \rfloor$ and fractional remainder $r = x - \lfloor x \rfloor$ for a floating-point number x. Implementations that determine both the floor and the fractional remainder share common components, thus reducing the total number of components required for both functions. Further, implementations of the present invention employ a floating-point subtractor; because most general-purpose processors include a floating-point subtractor, such implementations can be incorporated in such processors with few additional components.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Implementations of the present invention determine one or both of the floor $\lfloor x \rfloor$ and fractional remainder $r = x - \lfloor x \rfloor$ for a floating-point number x. One implementation is described below for floating-point numbers defined by IEEE (Institute of Electrical and Electronics Engineers) Standard 754 for single-precision binary floating-point computations (hereinafter referred to as "IEEE 754"). According to IEEE 754, a floating-point number is described by a 32-bit binary number having one bit of sign s, eight bits of exponent e, and 23 bits of mantissa m. A floating-point number is positive when s=0 and negative when s=1. The value of the mantissa m lies between one and two such that $$1 \leq 1 + 2^{-23} m \leq 2 \tag{1}$$

Therefore the floating point values of x are given by $$x = \begin{cases} (-1)^s 2^{e-127}(1 + 2^{-33}m) & 0 < e < 255 \\ 0 & e = 0, m = 0 \\ (-1)^s \infty & e = 255, m = 0 \end{cases} \tag{2}$$

In one implementation, the input x is a 32-bit single-precision floating-point number according to IEEE 754, $\lfloor x \rfloor$ is a 32-bit two's-complement integer, and r is a 32-bit single-precision floating-point number according to IEEE 754. However, the techniques of the present invention are applicable to inputs and outputs of different formats.

Implementations of the invention employ a biased exponent e that is simply a biased version of the exponent e' defined by IEEE 754. In the general case $$e = e' + 127 \tag{3}$$

However, IEEE 754 defines special cases for certain values of exponent e. For e=0, IEEE 754 specifies e'=−126, p=0, and $x_{min}$=0. For the case e=255, m=0, and s=0, IEEE 754 specifies x=+∞. For the case e=255, m=0, and s=1, IEEE 754 specifies x=−∞. For the case e=255 and m ≠0, x is not a number (NAN); this enables special meanings to be assigned to this case. For the convenience of the reader, these relationships are shown in Table 1.

TABLE 1

| Unbiased exponent e' | Biased exponent e | $x_{min}$ | $x_{max}$ | Implicit bit p | Fraction Mask c |
|---|---|---|---|---|---|
| −126 | 0 | 0 | $2^{-126}$ | 0 | 1111 1111 1111 1111 1111 1111 |
| −126 | 1 | $2^{-126}$ | $2^{-125}$ | 1 | 1111 1111 1111 1111 1111 1111 |
| ⋮ | ⋮ | ⋮ | ⋮ | ⋮ | ⋮ |
| −1 | 126 | ½ | 1 | 1 | 1111 1111 1111 1111 1111 1111 |
| 0 | 127 | 1 | 2 | 1 | 0111 1111 1111 1111 1111 1111 |
| 1 | 128 | 2 | 4 | 1 | 0011 1111 1111 1111 1111 1111 |
| 2 | 129 | 4 | 8 | 1 | 0001 1111 1111 1111 1111 1111 |
| 3 | 130 | 8 | 16 | 1 | 0000 1111 1111 1111 1111 1111 |
| ⋮ | ⋮ | ⋮ | ⋮ | ⋮ | ⋮ |
| 22 | 149 | $2^{21}$ | $2^{22}$ | 1 | 0000 0000 0000 0000 0000 0001 |
| 23 | 150 | $2^{22}$ | $2^{23}$ | 1 | 0000 0000 0000 0000 0000 0000 |
| ⋮ | ⋮ | ⋮ | ⋮ | ⋮ | ⋮ |
| 127 | 254 | $2^{126}$ | $2^{127}$ | 1 | 0000 0000 0000 0000 0000 0000 |
| 128 | 255 | ∞ | NAN | 1 | 0000 0000 0000 0000 0000 0000 |

Table 1 also shows the range of the floating-point values of x in terms of the maximum ($x_{max}$) and minimum ($x_{min}$) floating-point values of x possible for each exponent e. Table 1 also depicts the implicit bit p for each exponent e. Note that p=0 only when e=0, and p=1 otherwise.

Table 1 includes a fraction mask column for use with the present invention. In each row, Table 1 lists a value of exponent e and a corresponding fraction mask value c. For clarity, Table 1 depicts only the rows corresponding to e=0, 125<e<131, 148<e<151, and e>253. The contents of the remaining rows of Table 1 will be apparent to one skilled in the relevant arts after reading this description.

The mantissa m includes one or both of a fraction portion and an integer portion. Thus each bit of the mantissa m may be part of the integer portion or the fraction portion. The fraction mask indicates which bits of the mantissa belong to the fraction portion. If a mask bit is 1, the corresponding mantissa bit is part of the fraction portion. If a mask bit is 0, the corresponding mantissa bit is part of the integer portion. Referring to Table 1, when e<127, all of the mantissa bits belong to the fraction portion; when 126<e<150, some of the mantissa bits belong to the fraction portion and some to the integer portion; and when e>149, all of the mantissa bits belong to the integer portion. Note that the fraction mask is also applied to the implicit bit p.

Figure 1:
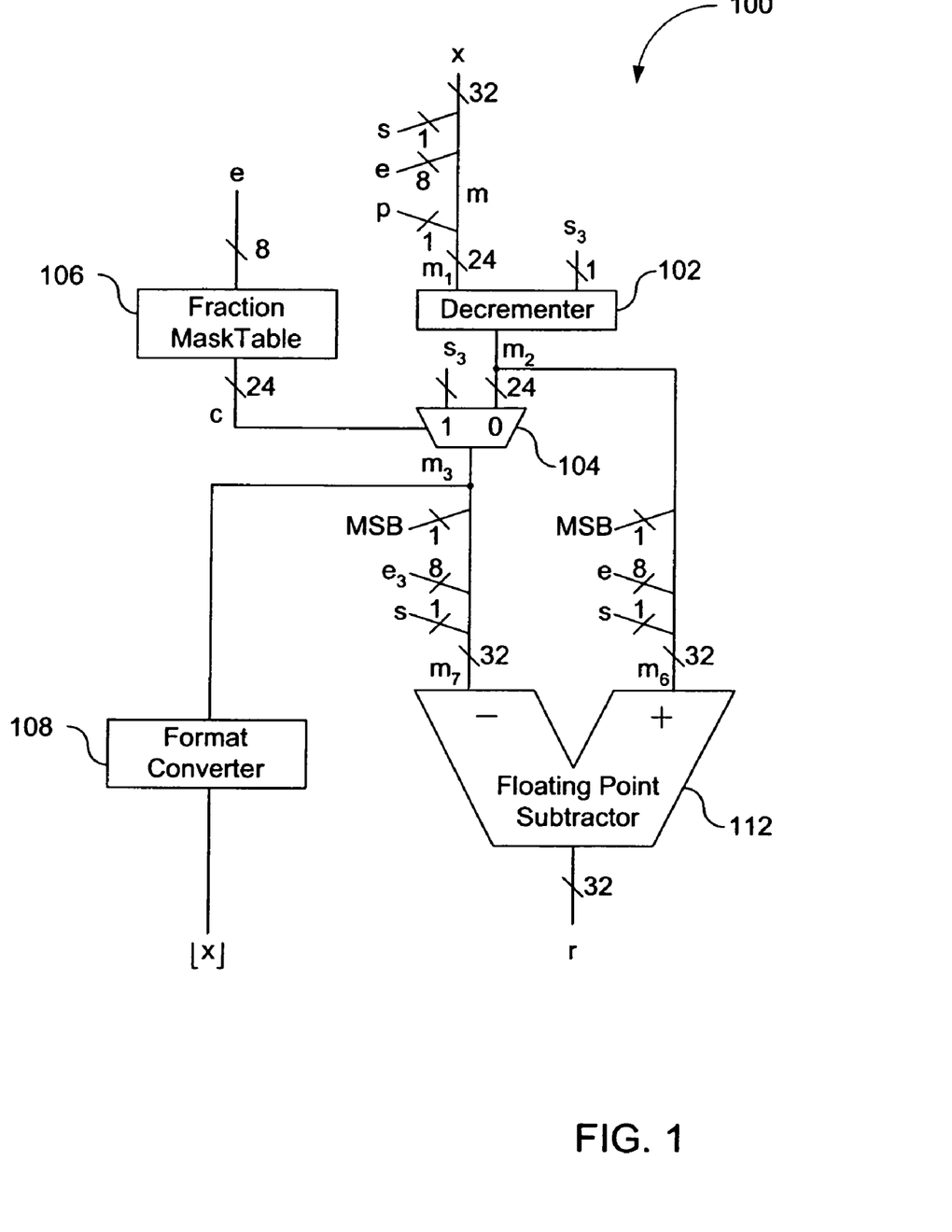
FIG. 1 is a logical block diagram of an apparatus according to an implementation of the present invention.
Figure 2:
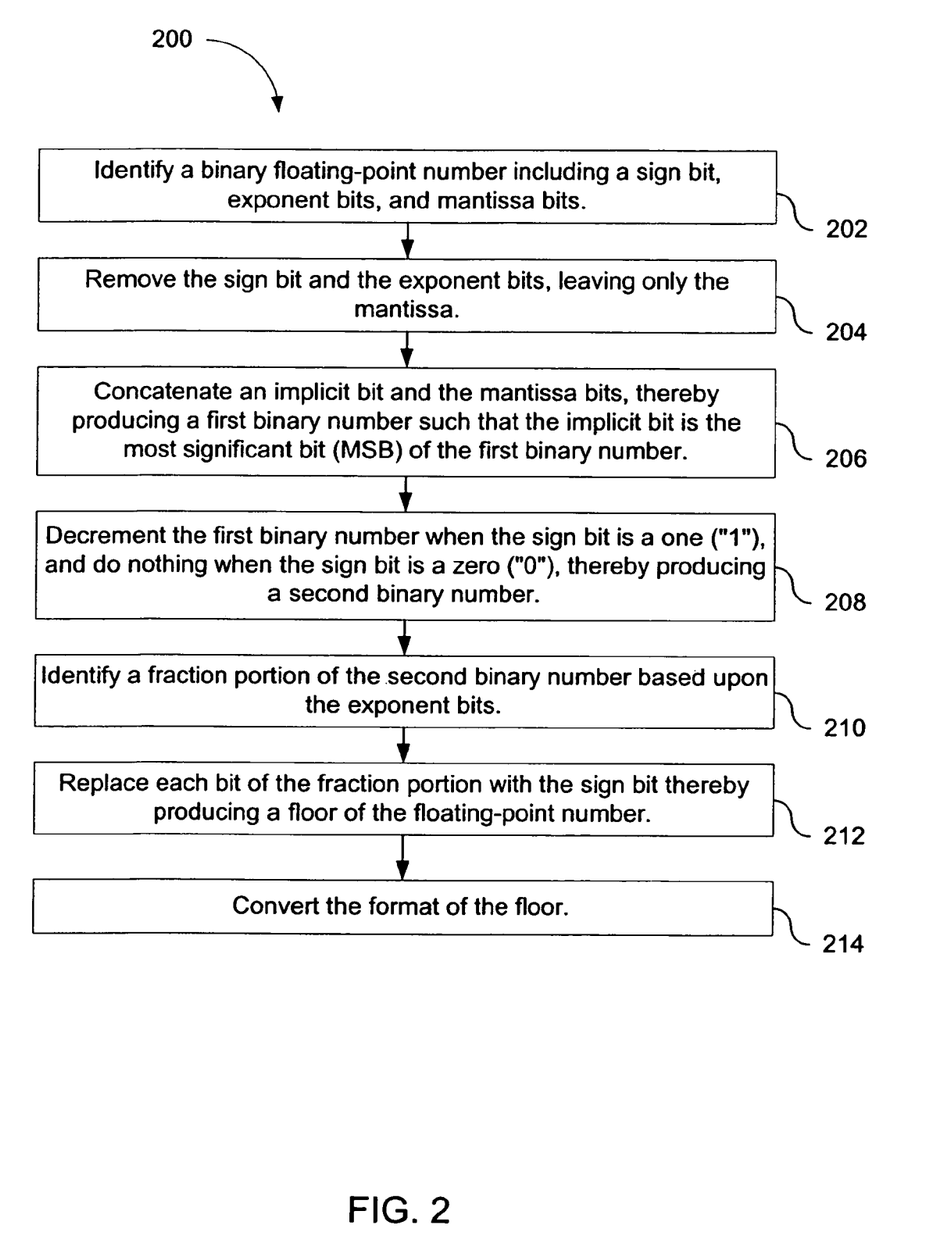
FIG. 2 is a flowchart depicting a process executed by the apparatus of FIG. 1 to determine a floor for a floating-point number according to one implementation.

FIG. 1 is a logical block diagram of an apparatus 100 according to an implementation of the present invention. FIG. 2 is a flowchart depicting a process 200 executed by apparatus 100 to determine a floor for a floating-point number according to one implementation.

Process 200 identifies a binary floating-point number x including a sign bit s, exponent bits e, and mantissa bits m (step 202). In one implementation, floating-point number x is a 32-bit single-precision floating-point number x.

Process 200 removes from x the sign bit s and the exponent bits e, leaving only the 23-bit mantissa m (step 204). Process 200 then concatenates an implicit bit p and mantissa m (step 206), thereby producing binary number $m_1$ such that implicit bit p is the most significant bit (MSB) of binary number $m_1$. Implicit bit p is selected according to the exponent e, as shown in Table 1. Such removing and concatenating of bits is accomplished by conventional wiring and bus routing structures apparent to one skilled in the relevant arts.

Process 200 decrements binary number $m_1$ by one if s=1 (indicating that the floating-point number is negative), thereby producing binary number $m_2$ (step 208); otherwise $m_2=m_1$. In the implementation of FIG. 1, the decrement operation is performed by a decrementer 102. In another implementation, as shown in FIG. 1, process 200 instead decrements binary number $m_1$ by one if a conditional sign bit $s_3$=1, thereby producing binary number $m_2$ (step 208), where conditional sign bit $s_3$ is given by if e>126, then $s_3$=s     (4)

else $s_3$=0

Otherwise $m_2=m_1$.

Process 200 identifies a fraction portion of binary number $m_2$ based upon the exponent e (step 210). In the implementation of FIG. 1, process 200 indexes a fraction mask table 106 using exponent e to obtain a fraction mask c. The fraction mask c has a one ("1") for each bit belonging to the fraction portion and a zero ("0") for each bit belonging to the integer portion. The fraction mask value c for each value of exponent e is given by Table 1.

Process 200 replaces each bit of the fraction portion with sign bit s. In another implementation, as shown in FIG. 1, process 200 replaces each bit of the fraction portion with conditional sign bit $s_3$, thereby producing a third binary number $m_3$ (step 212). In the implementation of FIG. 1, process 200 applies fraction mask c to binary number $m_2$, one bit at a time, LSB first, thereby producing binary number $m_3$. Each bit of fraction mask c is applied to a multiplexer 104 as the control input. The "1" input of multiplexer 104 is sign bit s. In another implementation, as shown in FIG. 1, the "1" input of multiplexer 104 is conditional sign bit $s_3$. The bits of binary number $m_2$ are fed sequentially to the "0" input of multiplexer 104. When a bit of fraction mask c is zero, multiplexer 104 gates the corresponding bit of binary number $m_2$. When a bit of fraction mask c is one, multiplexer 104 gates sign bit s. In another implementation, as shown in FIG. 1, when a bit of fraction mask c is one, multiplexer 104 gates conditional sign bit $s_3$. Binary number $m_3$ is a floor of floating point number x in a format referred to herein as "conditionally-decremented floating-point format." It is often convenient to convert floating-point floor $m_3$ to a more conventional format using a format converter 108 (step 214).

Figure 3:
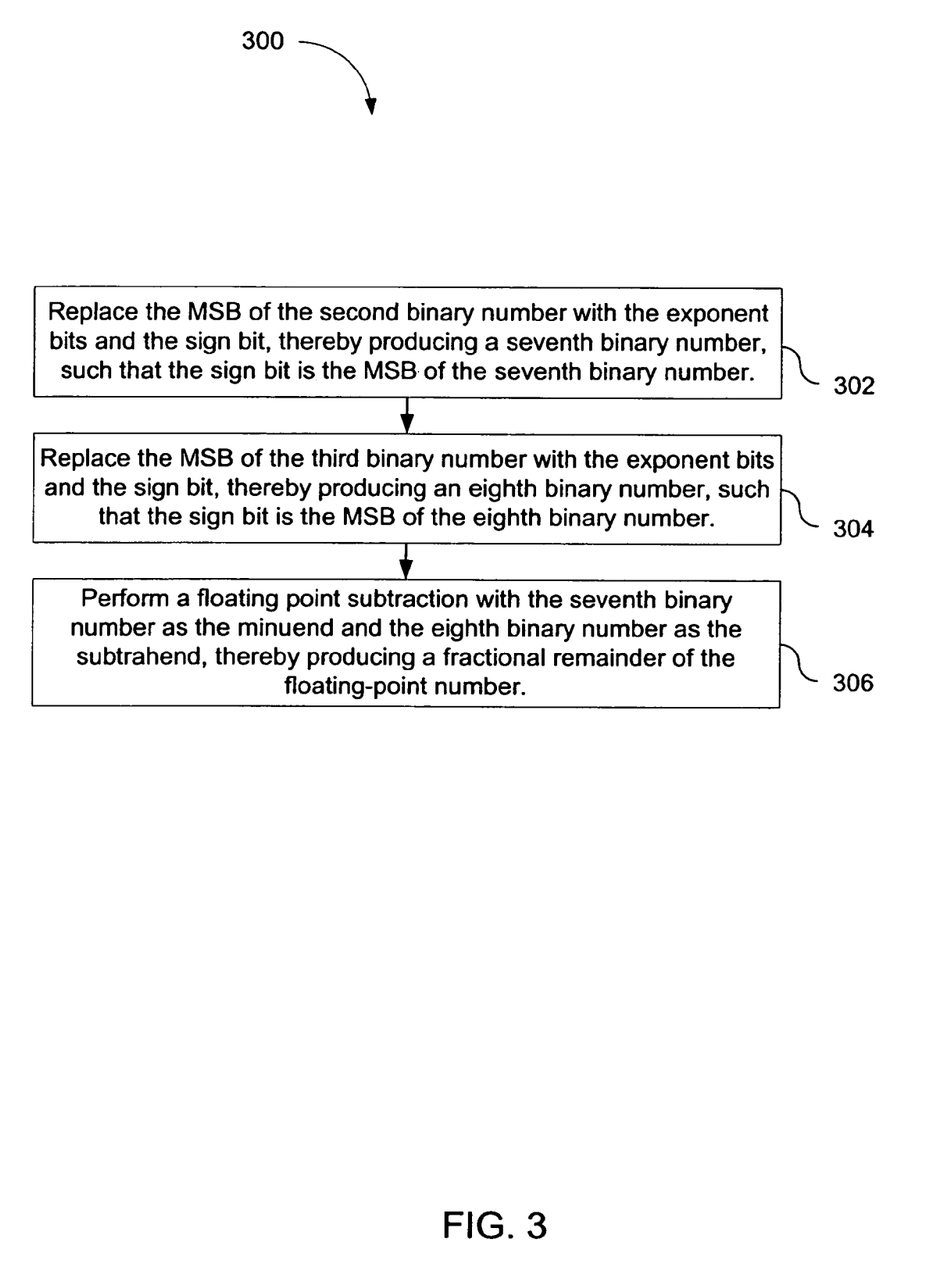
FIG. 3 is a flowchart depicting a process executed by the apparatus of FIG. 1 to determine a fractional remainder for a floating-point number according to one implementation.

FIG. 3 is a flowchart depicting a process 300 executed by apparatus 100 to determine a fractional remainder r=x−⌊x⌋ for a floating-point number x according to one implementation. Process 300 replaces the MSB of binary number $m_2$ with the exponent bits e and the sign bit s, thereby producing a binary number $m_6$, such that the sign bit s is the MSB of binary number $m_6$ (step 302). Similarly, process 300 replaces the MSB of binary number $m_3$ with exponent bits e and the sign bit s, thereby producing a binary number $m_7$, such that the sign bit s is the MSB of binary number $m_7$ (step 304). In another implementation, as shown in FIG. 1, process 300 replaces the MSB of binary number $m_3$ with conditional exponent bits $e_3$ and the sign bit s, thereby producing a binary number $m_7$, such that the sign bit s is the MSB of binary number $m_7$. Conditional exponent bits $e_3$ are given by if e>126 then $e_3$=e     (5)

else if s=1 then e=127 else e=0

Process 300 then takes the floating-point difference $m_7-m_6$ (step 306): that is, using binary number $m_6$ as the minuend and binary number $m_7$ as the subtrahend. In the implementation of FIG. 1, the difference is computed by a floating-point subtractor 112. The difference is the fractional remainder r presented as a 32-bit single-precision floating-point number according to IEEE 754.

Figure 4:
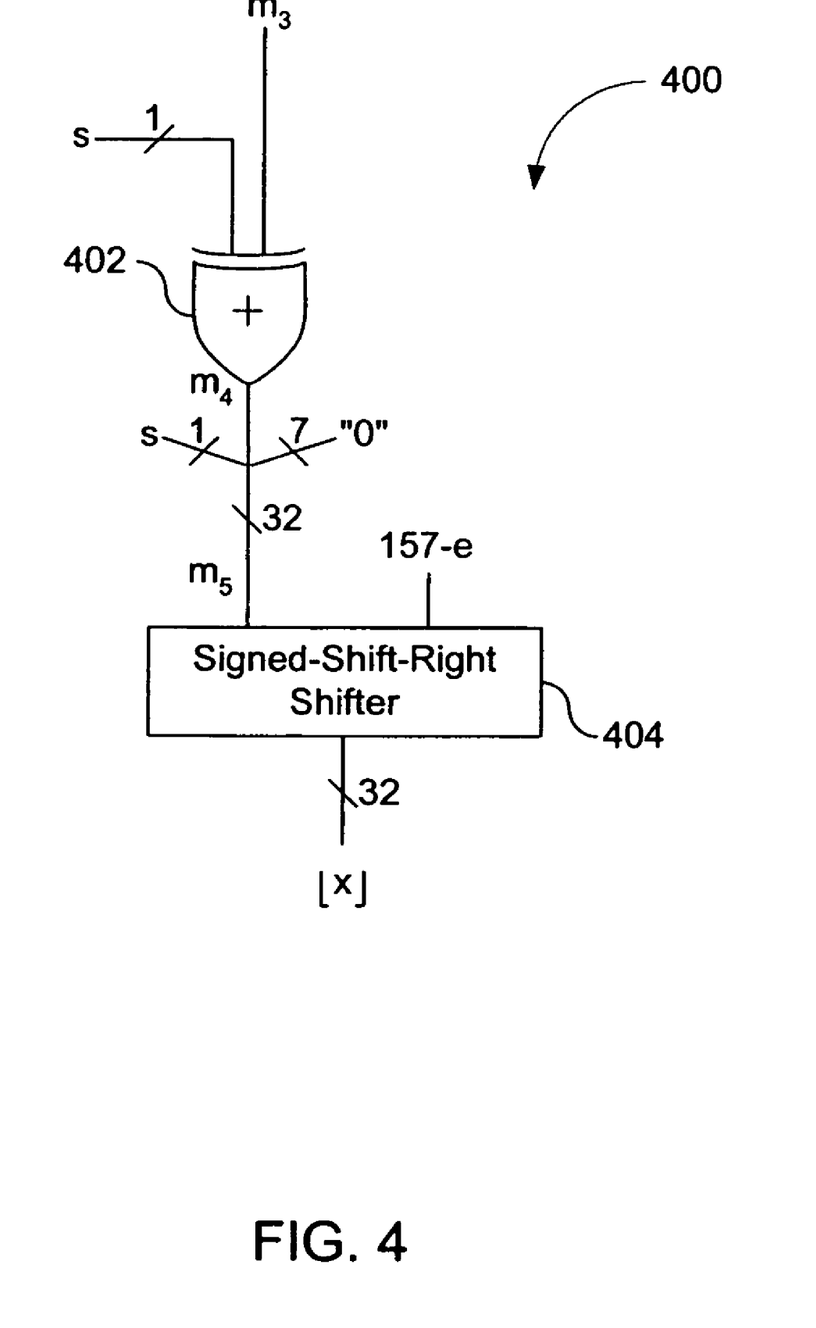
FIG. 4 is a logical block diagram of a format converter according to an implementation of the present invention.
Figure 5:
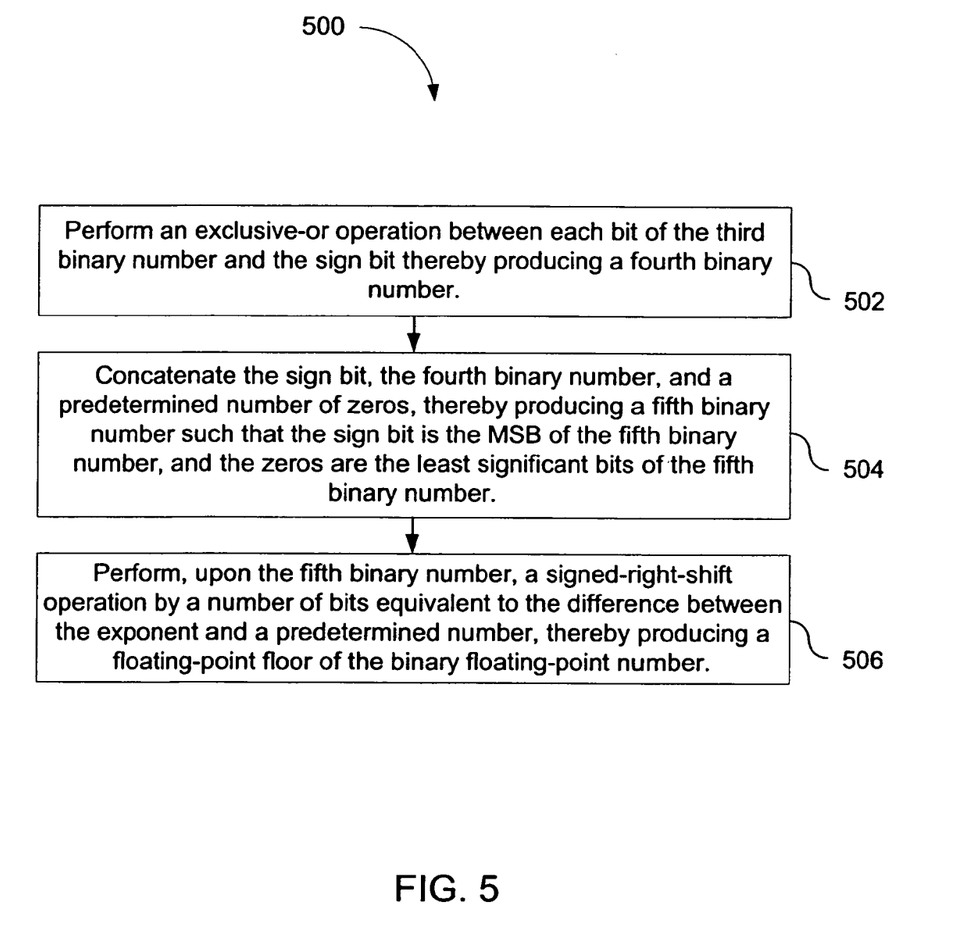
FIG. 5 is a flowchart depicting a process executed by the format converter of FIG. 4 to convert a floor from conditionally-decremented floating-point format to two's complement format according to one implementation.

FIG. 4 is a logical block diagram of a format converter 400 according to an implementation of the present invention. FIG. 5 is a flowchart depicting a process 500 executed by format converter 400 to convert floor $m_3$ from conditionally-decremented floating-point format to two's complement format according to one implementation.

Process 500 performs an exclusive-OR (XOR) operation between each bit of binary number $m_3$ and sign bit s, thereby producing 24-bit binary number $m_4$ (step 502). In one implementation, the XOR operation is performed using an XOR gate 402 or some other such complemented.

Process 500 concatenates binary number $m_4$ and a predetermined number of zeros, such that the zeros are the least significant bits (LSB) of the result (step 504). The predetermined number of zeros z is given by $z=\text{bits}(\lfloor x \rfloor)-\text{bits}(m_3)-1$     (6)

where bits($\lfloor x \rfloor$) is the number of bits in the floating-point floor $\lfloor x \rfloor$ and bits ($m_3$) is the number of bits in binary number $m_3$. In the implementation of Table 1, bits($\lfloor x \rfloor$)=32 and bits($m_3$)=24, yielding z=7.

Process 500 concatenates the result and sign bit s, thereby producing a binary number $m_5$ such that the sign bit s is the MSB of binary number $m_5$ (step 504). Binary number $m_5$ is a signed two's complement mantissa of the floor of x.

Process 500 performs, upon binary number $m_5$, a signed-right-shift operation by h bits where $$h = \text{offset} + \text{bits}(m) + z - e \qquad (7)$$

where offset is the bias offset (that is, the difference between biased exponent e and unbiased exponent e' in the general case where e·0), bits(m) is the number of bits in mantissa m, and z is the predetermined number of zeros added to binary number $m_3$ (step 506). In the implementation of Table 1, offset=127, bits(m)=23, and z=7, yielding h=157−e. The output of signed-shift-right shifter 110 is $\lfloor x \rfloor$ in two's complement format. A signed-shift-right operation shifts the contents of the shifter by h bits while filling the new MSBs created by the shift with the MSB of the contents before the shift, as is well-known in the relevant art. In the implementation of FIG. 1, the MSB before shifting is the sign bit s. In one implementation, the signed-shift-right is performed by a signed-shift-right shifter 110.

Figure 6:
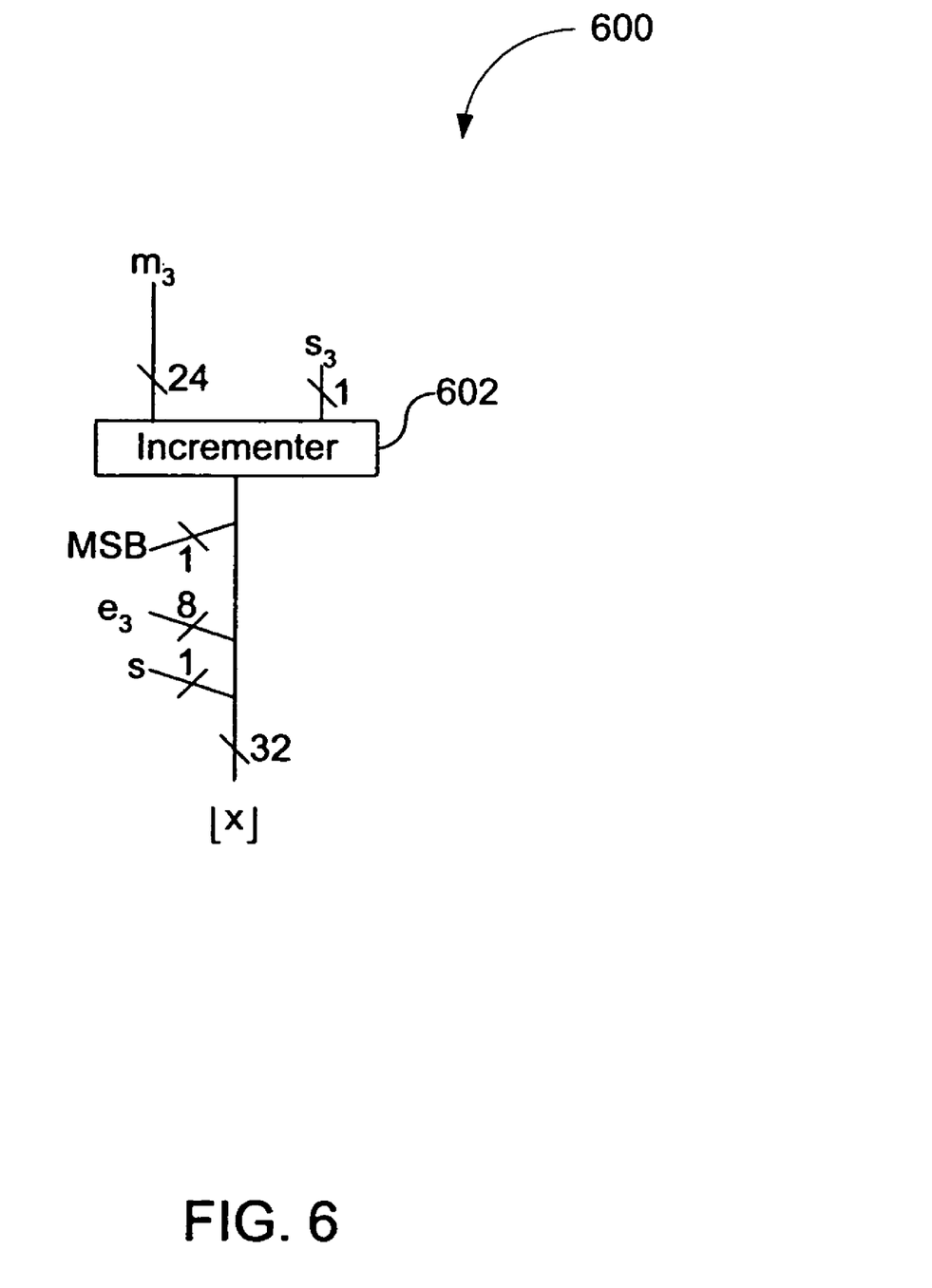
FIG. 6 is a logical block diagram of a format converter according to an implementation of the present invention.
Figure 7:
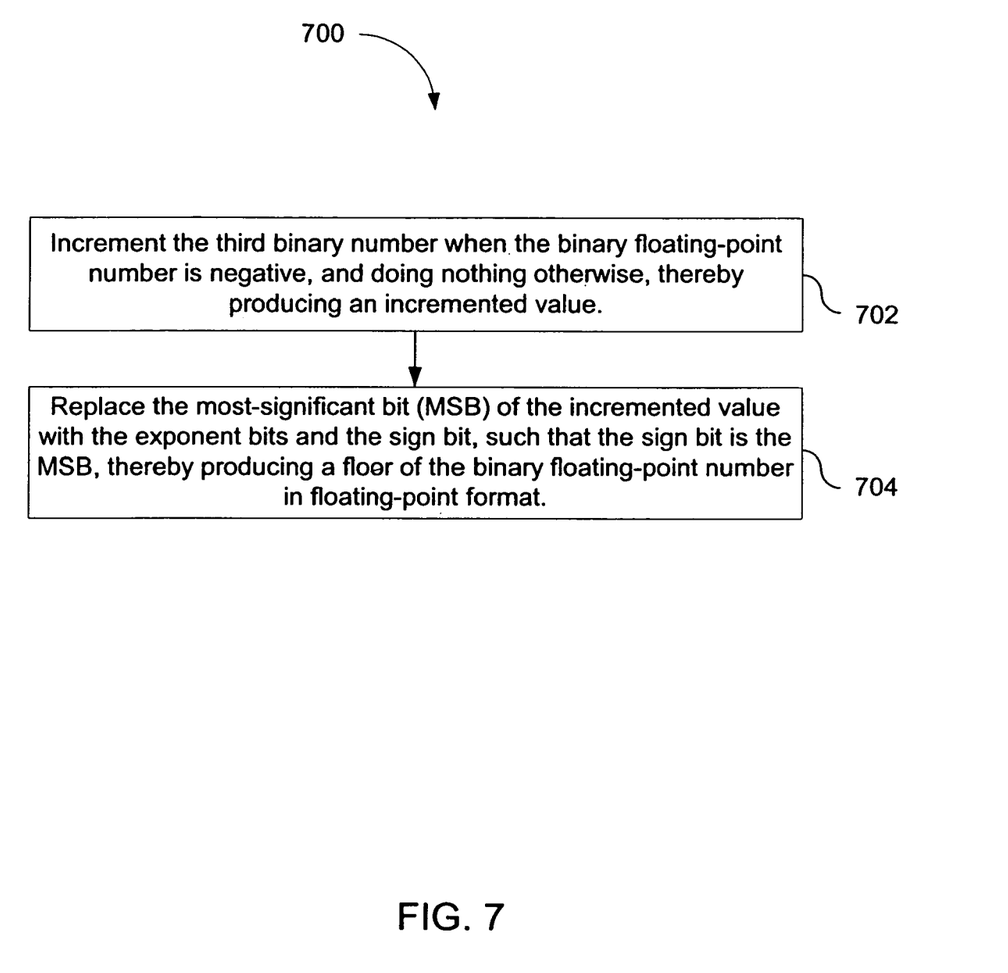
FIG. 7 is a flowchart depicting a process executed by the format converter of FIG. 6 to convert a floor from conditionally-decremented floating-point format to floating-point format according to one implementation.

FIG. 6 is a logical block diagram of a format converter 600 according to an implementation of the present invention. FIG. 7 is a flowchart depicting a process 700 executed by format converter 600 to convert floor $m_3$ from conditionally-decremented floating-point format to floating-point format according to one implementation.

Process 700 increments binary number $m_3$ by one if s=1 (indicating that the floating-point number is negative), and does nothing otherwise, thereby producing an incremented value (step 702). In the implementation of FIG. 6, the decrement operation is performed by a incrementer 602. In another implementation, as shown in FIG. 6, process 700 instead increments binary number $m_3$ by one if a conditional sign bit $s_{3=1}$, and does nothing otherwise, thereby producing the incremented value (step 702).

Process 700 then replaces the most-significant bit (MSB) of the incremented value with the exponent bits e and the sign bit s, such that the sign bit s is the MSB, thereby producing the floor of the binary floating-point number in floating-point format. In another implementation, as shown in FIG. 6, process 700 replaces the MSB of the incremented value with conditional exponent bits $e_3$ and the sign bit s, such that the sign bit s is the MSB, thereby producing the floor of the binary floating-point number in floating-point format.

The present invention can be implemented in software. One implementation, in C code, is listed below. The code returns the floating-point floor in two's complement format as m6, returns the floating-point floor in floating-point format as f3, and returns the fractional remainder as f9.

```
// floor.cpp
//
#include "stdafx.h"
#include <stdlib.h>
#include <stdio.h>
#include <math.h> // floor
#define LIM(n) ((n)>31 ? 31 : (n)<0 ? 0 : (n))
#define BIT(x,n) (((x) >> (n)) & 1)              // x[n]
#define BITS(x,m,l) (((x) >> (l)) & ones >>(31-(m)+(l)))// x[m:l]
```

-continued

```
#define CC(n,x,y) ( (x) << (n) | BITS(y,(n)-1,0) )     // ConCatinate
{x,y}
int main(int argc, char* argv[])
{
    unsigned int fm,i,s,s3,x,m0,m1,m2,m3,m4,m7,m8,m9,ones=
-1;n,fm,s,s3,x,m0,m1,m2,m3,m4,m7,m8,m9,ones=-1;
    int e,e3,m5,m6;
    float f,f6,f7,f8,f9,f10;
    int
test[10]={0x4f000000,0xb0300000,0x3f000000,0xbf000000,0,
    0x80000000,0x80000001,1,
        0xc0100000,0xc0000000};
// for (i=0;i<10;i++){
//      x     = test[i];
    for (n = 0;n==0;n+=0x80000000)
        for (x=n;x<n+0x4f000000;x++){f,f3,f6,f7,f8,f9,f10;
    for (n = 0;n==0;n+=0x80000000)    // test positive and neg sign
        for (x=n;x<n+0x4f000000;x++){                            //
all values except NaN's
// FLOOR and REMAINDER begin HERE
// Fig 1 Remainder
    f     = *(float *)&x;
    m0    = *(int *)&f;
    s     = BIT(x,31);
    e     = BITS(x,30,23);
    m1    = CC(23,(e>0),BITS(x,22,0));
    s3    = s & (e>126);
    m2    = (m1 − s3)&0xffffff;
    fm    = 0xffffff >> LIM(e−126);
    e3    = e<127 ? 127*s : e;
    m3    = m2 & ~fm | (−s3) & fm;
    m7    = CC(31,s,CC(23,e,BITS(m2,22,0)));
    m8    = CC(31,s,CC(23,e3,BITS(m3,22,0)));
    f7    = *(float *)&m7;
    f8    = *(float *)&m8;
    *(float *)&m9 = f7 − f8;
    f9    = *(float *)&m9;
// FIG 4, INTEGER FLOOR
    m4    = m3 ^ (s * 0xffffff);
    m5    = CC(31,s,m4<<7);
    m6    = m5 >> LIM(157−e);
// Fig 6, FLOATING POINT FLOOR
    *(int *)&f3 = CC(31,s,CC(23,e3,BITS(m3+s3,22,0)));
// TEST RESULTS AGAINST FLOOR IN C LIBRARY
    f6    = floor(f);
    f10   = f−f6;
    if ((f9!=f10) | (m6!=(int)f6))(e < 158) & (m6!=(int)f6) | (f3!=f6) )
                printf("\nx=%08x,",x); // floor(−0.0) returns −1
instead of 0.
    if ((x&0x07fffff)==0)
                printf(".");
}}
    return 0;
}
```

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. For example, apparatus 100 and process 200 can easily be modified to find only one of the floating-point floor and fractional remainder, rather than both. Further, apparatus 100 and process 200 can easily be modified to handle numbers having a different number of bits than those described above. Accordingly, other embodiments are within the scope of the following claims.

What is claimed is:

1. An apparatus for processing a binary floating-point number having a sign bit, an exponent portion, and a mantissa, the apparatus comprising:
    means for indicating a fraction portion of the mantissa, based on the exponent portion of the binary floating-point number;
    means for replacing the indicated fraction portion of the mantissa with the sign bit; and
    means for producing a floor of the binary floating-point number.

2. The apparatus of claim 1, wherein the means for indicating include:
    means for concatenating an implicit bit of the binary floating-point number with the fraction portion of the mantissa and producing a first binary number such that the implicit bit is the most significant bit (MSB) of the first binary number;
    means for decrementing the first binary number only if the sign bit indicates a negative binary floating-point number and leaving the first binary number changed otherwise, thereby producing a second binary number, and
    means for identifying bits of the second binary number as the fraction portion of the mantissa, in accordance with the exponent portion.

3. The apparatus of claim 2, further comprising a converter that is configured to convert the floor to a desired representation format.

4. The apparatus of claim 3, wherein the desired representation format comprises two's complement format.

5. The apparatus of claim 3, wherein the desired representation format comprises floating point format.

6. The apparatus of claim 2, wherein the means for producing include:
    a multiplexer configured to receive the identified fraction portion and operative to replace each constituent bit of the identified fraction portion with the sign bit, thereby producing a third binary number;
    an exclusive-OR configured to perform an exclusive-OR operation between each bit of the third binary number and the sign bit thereby producing a fourth binary number;
    means for concatenating the sign bit, the fourth binary number, and a first predetermined number of zeros, thereby producing a fifth binary number such that the sign bit is the MSB of the fifth binary number, and the zeros are the least significant bits of the fifth binary number; and
    a signed-right-shift configured to perform, upon the fifth binary number, a signed-right-shift operation by a number of bits equivalent to the difference between the exponent and a second predetermined number, thereby producing the floor of the binary floating-point number in integer format.

7. The apparatus of claim 1, wherein the means for indicating include a fraction mask table configured to identify the fraction portion of the binary floating-point number, based at least on the exponent portion of the binary floating-point number.

8. The apparatus of claim 1, wherein the means for producing include a multiplexer configured to receive the identified fraction portion and operative to replace each constituent bit of the identified fraction portion with the sign bit, thereby producing the floor.

* * * * *